United States Patent [19]
Haines

[11] Patent Number: 5,211,609
[45] Date of Patent: May 18, 1993

[54] ELASTOMERIC DRIVE BELT

[75] Inventor: Edwin L. Haines, Akron, Ohio

[73] Assignee: The Goodyear Tire & Rubber Company, Akron, Ohio

[21] Appl. No.: 832,139

[22] Filed: Feb. 6, 1992

[51] Int. Cl.$^5$ .............................................. F16G 1/08
[52] U.S. Cl. ..................................... 474/260; 474/268
[58] Field of Search ................................ 474/260–268

[56] References Cited
U.S. PATENT DOCUMENTS

| | | | |
|---|---|---|---|
| 2,141,796 | 12/1938 | Loges | 474/262 |
| 3,616,832 | 11/1971 | Shima et al. | 474/262 X |
| 4,688,615 | 8/1987 | Lee | 474/261 X |
| 4,721,498 | 1/1988 | Grob | 474/261 |

Primary Examiner—Thuy M. Bui
Attorney, Agent, or Firm—Marc R. Dion, Sr.

[57] ABSTRACT

An elastomeric drive belt having cable reinforcement wherein lateral forces generated by the various layers of cables while the drive belt is in use are neutralized to prevent tracking problems.

3 Claims, 1 Drawing Sheet

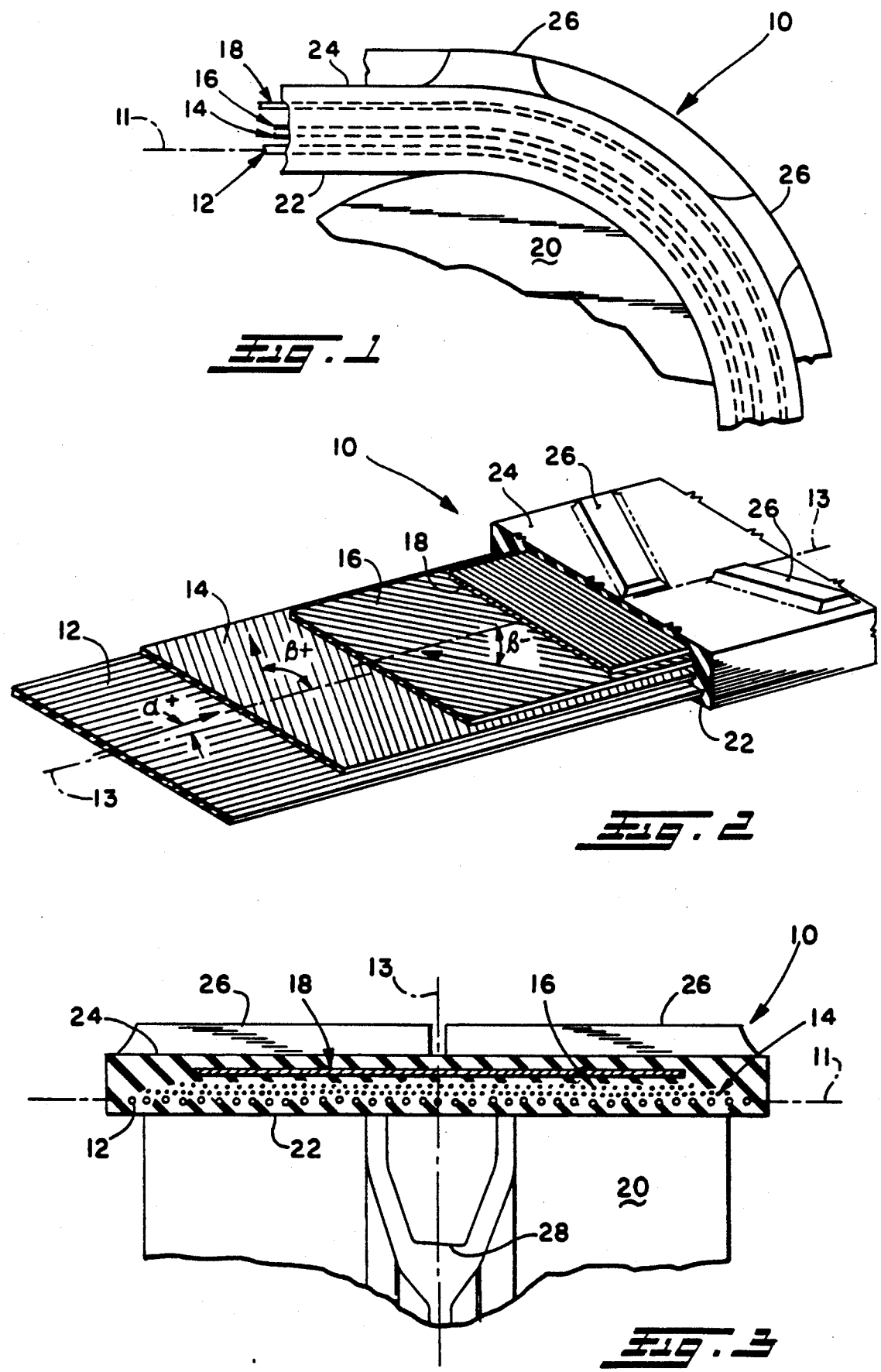

ELASTOMERIC DRIVE BELT

FIELD OF THE INVENTION

This invention relates to an endless elastomer drive belt. More particularly, it relates to a drive belt constructed to prevent tracking problems caused by lateral forces generated during the belt's use.

BACKGROUND OF THE INVENTION

U.S. Pat. No. 4,721,498 discloses an endless elastomeric drive belt designed to minimize lateral shifting, having a first ply of wire cable reinforcement substantially parallel to the longitudinal direction of the belt, a second ply of wire cable reinforcement laid at a bias angle and a third ply of wire cable reinforcement laid at a bias angle. The angle of the third ply cables is larger than that of the second ply in order that the lateral force components of the outer two plies balance each other when being bent around a wheel. Alternatively, the patent discloses a belt with the two outer plies being laid at equal and opposite bias angles, however, the two plies are constructed differently with the third ply having fewer ends than the second ply either by having smaller cables or a lesser number of cables, again to balance the lateral forces exerted by the outer two plies. Producing two plies of different construction is inefficient, costly and can lead to difficulties should they be mistakenly interchanged in a manufacturing operation.

The '498 patent correctly assumes that the tensile cables in the longitudinal direction do not exert a lateral force due to their being bent around a wheel. However, since the tensile cable is commonly spirally wrapped as a practical matter, the cable is not at 0° to the longitudinal direction. When a drive belt is installed on the wheels of a vehicle to be driven by friction, a preload of force is applied to the belt in the longitudinal direction. This force exerts a bending moment on the spirally wrapped cables in the transverse direction as the cables attempt to attain the 0° direction which affects the tracking of the drive belt.

SUMMARY OF THE INVENTION

In accordance with the practice of the present invention there is provided an endless elastomeric drive belt whose construction affords a balance of all the lateral forces exerted thereon which would affect the tracking of the belt.

The belt comprises: (a) an endless body having an interior surface, an exterior surface and a pitch line located therebetween extending in a longitudinal direction; (b) a ply of spirally wrapped cable reinforcement extending in the longitudinal direction, parallel to the interior and exterior surfaces and located at or near the pitch line and when placed under tension defining a first lateral force; (c) a first bias ply of cable reinforcement laid on an angle to the longitudinal direction outwardly of said spirally wrapped cable and in the same direction from the longitudinal direction as the spirally wrapped cable, and defining in use a second lateral force; and (d) a second bias ply of cable reinforcement laid on an angle to the longitudinal direction outwardly of said first bias ply which angle is equal in magnitude and opposite in direction to said first bias ply angle and at such a distance from the pitch line to generate a third lateral force which neutralizes the sum of the first and second lateral forces.

BRIEF DESCRIPTION OF THE DRAWINGS

FIG. 1 is a fragmentary side elevational view of the belt partially wrapped around a wheel.

FIG. 2 is a perspective view of the belt with the ply portions broken away in layers.

FIG. 3 is a diagrammatic and enlarged transversed cross-sectional view of the belt on a wheel.

DETAILED DESCRIPTION OF THE INVENTION

The rubber drive belt, shown generally at (10), is produced on a cylindrical mandrel by applying one or more layers of a gum rubber either directly to the mandrel or onto an impression fabric which has been applied to the mandrel to form the interior surface (22) of the belt. This is followed by a ply of spirally wrapped cable reinforcement (12) which extends in the longitudinal direction (13) and is parallel to the interior surface (22) and located at or near the pitch line (11) so that when it is placed under tension there is defined a first lateral force. Radially outward from this spirally wrapped cable (12), there is applied a first bias ply of cable reinforcement (14) which is laid on an angle $\beta+$ to the longitudinal direction (13) and in the same direction as the spirally wrapped cable angle $\alpha+$. When in use and wrapped around wheel 20 this first bias ply of cable reinforcement (14) defines a second lateral force. Radially outward from the first bias ply of cable reinforcement (14), there is applied a second bias ply of cable reinforcement (16) which is laid on an angle $\beta-$ to the longitudinal direction, which angle $\beta-$ is equal in magnitude and opposite in direction to the angle $\beta+$ of the first bias ply (14). This second bias ply of cable reinforcement (16) is located at such a distance from the pitch line (11) to generate in use a third lateral force which neutralizes the sum of the first and second lateral forces.

While not a necessity, there is also shown a fourth layer of cable reinforcement (18) whose cables are laid perpendicular to the longitudinal direction (13). Above the second bias ply of cable reinforcement, or optionally above the lateral layer of cable reinforcement 18), there is applied one or more layers of rubber to form the exterior surface (24). To the exterior surface (24) there are applied a number of cleats (26) which provide the ground engaging surface.

To the interior surface (22), it is desirable to provide a V-guide (28) to register with the groove provided in wheel 20. While V-guide (28) is illustrated as not being in contact with the groove of wheel 20, it is contemplated that the V-guide (28) can be sized to provide additional friction engagement with the groove.

The layers of rubber which are used to form the interior or exterior surfaces and to coat the various layers of cable reinforcement as well as to form the cleats (26) can be any one of a number of natural or synthetic polymers well known in the art and compounded with the usual rubber chemicals to provide adhesion to the cable reinforcement and to vulcanize into a unitary body.

Depending on the size of the drive belt to be produced and the size of the longitudinal reinforcement cable, it is contemplated that the angle $\alpha$ of the longitudinal cable reinforcement can range from 0.015° to 0.35°. The magnitude of the angle $\beta$ of the bias plies can be from about 45° to about 75°. It is preferred that the angle $\beta$ be about 70°.

While certain representatives embodiments and details have been shown for the purpose of illustrating the invention, it would be apparent to those skilled in this art that various changes and modifications may be made therein without departing from the spirit or scope of the invention.

What is claimed is:

1. An endless elastomeric drive belt comprising:
   (a) an endless body having an interior surface, an exterior surface and a pitch line located therebetween extending in a longitudinal direction;
   (b) a ply of spirally wrapped cable reinforcement extending in the longitudinal direction parallel to the interior and exterior surfaces and located at or near the pitch line and when placed under tension defining a first lateral force;
   (c) a first bias ply of cable reinforcement laid on an angle to the longitudinal direction outwardly of said spirally wrapped cable and in the same direction from the longitudinal direction as the spirally wrapped cable, and defining in use a second lateral force; and
   (d) a second bias ply of cable reinforcement laid on an angle to the longitudinal direction outwardly of said first bias ply which angle is equal in magnitude and opposite in direction to said first bias ply angle and at such a distance from the pitch line to generate a third lateral force which neutralizes the sum of the first and second lateral forces.

2. The drive belt according to claim 1 wherein the angle of the bias plies is from 45° to 75° from the longitudinal direction.

3. The drive belt according to claim 2 wherein the angle of the bias plies is 70°.

* * * * *